United States Patent [19]

Friedman

[11] 4,104,669
[45] Aug. 1, 1978

[54] THERMALLY RESPONSIVE PHOTOGRAPHIC PROCESSING APPARATUS FOR USE WITH SELF-PROCESSABLE FILM UNITS

[75] Inventor: Harvey S. Friedman, Natick, Mass.

[73] Assignee: Polaroid Corporation, Cambridge, Mass.

[21] Appl. No.: 787,748

[22] Filed: Apr. 15, 1977

[51] Int. Cl.² ............................................. G03D 9/02
[52] U.S. Cl. ..................................... 354/304; 354/86
[58] Field of Search .................... 354/84, 85, 86, 299, 354/301, 303, 304; 96/76 C

[56] References Cited

U.S. PATENT DOCUMENTS

| | | | |
|---|---|---|---|
| 2,991,703 | 7/1961 | Eloranta | 354/304 |
| 3,241,468 | 3/1966 | Wolff | 354/304 |
| 3,584,563 | 6/1971 | Chen | 354/304 |
| 3,589,262 | 6/1971 | Chen | 354/304 |
| 3,604,329 | 9/1971 | Land | 354/304 |
| 3,732,099 | 5/1973 | Chen | 96/76 C |
| 3,777,647 | 12/1973 | Land | 354/304 |
| 3,779,770 | 12/1973 | Alston et al. | 354/86 |
| 3,820,137 | 6/1974 | Driscoll | 354/301 |

*Primary Examiner*—L. T. Hix
*Assistant Examiner*—Alan Mathews
*Attorney, Agent, or Firm*—Frank J. Caufield

[57] ABSTRACT

In a photographic processing apparatus of the type including a pair of juxtaposed pressure applying members between which a self-processable type film unit is advanced to apply a pressure to the film unit to spread a viscous processing fluid in a thin layer between a pair of sheet elements of the film unit, a bimetallic strip is provided to sense ambient temperature and in response thereto apply a second pressure to the film unit as it is advanced between the pressure applying members to compensate for temperature induced changes in the fluid's viscosity which cause variations in the thickness of the processing fluid layer such that the bimetallic strip operates to maintain the thickness of the processing fluid layer substantially constant over a predetermined temperature operating range of the apparatus.

12 Claims, 8 Drawing Figures

THERMALLY RESPONSIVE PHOTOGRAPHIC PROCESSING APPARATUS FOR USE WITH SELF-PROCESSABLE FILM UNITS

BACKGROUND OF THE INVENTION

1. Field of the Invention

This invention relates to thermally responsive photographic processing apparatus and, more particularly, to processing apparatus including temperature responsive fluid distribution control means for use with self-processable film units.

2. Description of the Prior Art

Photographic processing apparatus for use with self-processable type film units are well known and generally comprise a pair of elongated juxtaposed pressure applying members between which an exposed film unit is advanced to initiate a photographic diffusion transfer process for developing and forming a visible image in the film unit. Such film units, as for example those described in considerable detail in U.S. Pat. Nos. 2,543,181; 3,415,644; and 3,594,165, normally contain all the photographic components necessary for the diffusion transfer process. Physically, these film units typically comprise a pair of superposed sheet elements which serve to support layers of photochemical substances that comprise photosensitive and image-receiving layers; and, as well, include as an integral part a rupturable container of viscous processing fluid positioned adjacent a leading edge of the film unit and adapted to have the processing fluid released between the sheet elements to initiate the diffusion transfer process. Subsequent to exposure, the film unit is advanced, leading edge first, through the pressure applying members which serve first to rupture the container to release the processing fluid and then to cause the released mass of processing fluid to flow between the sheet elements, opposite to their direction of travel, so that the processing fluid is progressively deposited between the sheet elements as a thin layer coextensive with the exposure area of the film unit as the film unit is advanced between the pressure applying members.

For optimum photographic image quality with film units utilizing this type of process, it is generally recognized that the thickness of the processing fluid layer must be maintained at a substantially constant predetermined thickness value which is uniform over the photo-exposed area of the film unit. However, there are a number of factors which may affect the thickness and uniformity of the processing fluid layer. Among these is the viscosity of the fluid itself.

Changes in the viscosity of the processing fluid come about because its nature and composition are such that its viscosity, in general, may vary with changes in temperature. Moreover, because photographic systems such as cameras and the like employing such film units and processing apparatus are used both indoors and outdoors over a range of temperatures, the viscosity of the processing fluid changes with the ambient operating temperature of the system. This situation presents a problem in maintaining the thickness and uniformity of the fluid layer constant over the temperature operating range of the photographic system.

There are a number of prior art disclosures which recognize this problem and provide apparatus and structure for compensating for changes in the thickness and uniformity of the processing fluid layer caused by temperature induced changes in the processing fluid's viscosity. For example, U.S. Pat. No. 3,589,262 issued to Richard J. Chen on June 29, 1971 and entitled "PHOTOGRAPHIC PROCESSING APPARATUS" and U.S. Pat. No. 3,732,099 also issued to Richard J. Chen on June 21, 1968 and entitled "TEMPERATURE SENSITIVE PRESSURE-APPLYING MEMBERS FOR A PHOTOGRAPHIC PROCESSING LIQUID" collectively disclose apparatus and processes which include "means for automatically sensing the ambient temperature and responding by varying the compressive pressure exerted by rolls (pressure applying members) on the film unit in inverse relation to the temperature so as to maintain constant a relationship between liquid viscosity and compressive pressure that will insure spreading of the processing liquid in a layer of predetermined depth even though the temperature and viscosity may vary." And in U.S. Pat. No. 3,604,329 issued to Edwin H. Land on Sept. 14, 1971 and entitled "PHOTOGRAPHIC APPARATUS AND PROCESS FOR CONTROLLING THE DEVELOPMENT OF INDIVIDUAL FILM UNITS AS A FUNCTION OF TEMPERATURE" the disclosure provides "means for automatically sensing the ambient temperature and varying the rate of rotation of the rolls (pressure applying members) in accordance with temperature so as to maintain constant a relationship between liquid viscosity and speed of movement of the film unit that will insure spreading of the processing liquid in a layer of predetermined depth even though the temperature and viscosity may vary." Also, this disclosure suggests that it may be advisable to vary the pressure exerted by the rolls on the film unit in combination with varying the roller speed. While the foregoing patents disclose structure for solving the problem, they utilize a complex structure and mechanism for varying the actual pressure exerted by the rolls to a film unit.

A number of other prior art patents do disclose means for applying a second pressure for purposes of controlling the flow of the processing fluid as it is spread in the film unit after exposure. Patents in this category include: U.S. Pat. No. 2,991,703 issued to V. K. Eloranta on Aug. 29, 1958 and entitled "PHOTOGRAPHIC APPARATUS"; U.S. Pat. No. 3,777,647 issued to Edwin H. Land on Dec. 11, 1973 and entitled "PHOTOGRAPHIC APPARATUS AND METHOD FOR TREATING PHOTOGRAPHIC MATERIALS WITH A LIQUID"; U.S. Pat. No. 3,241,468 issued to O. E. Wolff on Mar. 22, 1966 and entitled "PHOTOGRAPHIC APPARATUS"; U.S. Pat. No. 3,820,137 issued to John J. Driscoll on June 25, 1974 and entitled "PHOTOGRAPHIC APPARATUS"; and U.S. Pat. No. 3,779,770 issued to William W. Alston, John J. Driscoll and Richard R. Wareham on Dec. 18, 1973 and entitled "PHOTOGRAPHIC FILM ASSEMBLAGE FOR A DIFFUSION TRANSFER FILM". However, none of these disclosures deal with the problem of compensating for temperature related viscosity changes.

Therefore, it is a primary object of the invention to provide a simplified photographic processing apparatus for use with self-processable type film units to compensate for variations in the thickness of a processing fluid layer caused by temperature related changes in the fluid's viscosity as the fluid is spread in a thin layer in the film unit.

Another object of this invention is to provide a simplified photographic processing apparatus for use with self-processable type film units having means for applying a second pressure to the film unit as a viscous fluid processing fluid is spread in a thin layer between a pair of sheet elements of the film unit to oppose the flow of the processing fluid relative to the sheet elements to compensate for temperature related viscosity changes in the fluid so as to maintain the thickness of the processing fluid layer substantially constant over a predetermined range of operating temperatures of the apparatus.

Other objects of the invention will in part be obvious and will in part appear hereinafter. The invention accordingly comprises the apparatus possessing the construction, combination of elements and arrangement of parts which are exemplified in the following detailed disclosure.

SUMMARY OF THE INVENTION

This invention relates to photographic apparatus for processing a cassette of self-processable type film units, subsequent to their exposure, in order to initiate a diffusion transfer photographic process for developing and forming a visible image in each exposed film unit. The film units are each of the type which includes a pair of superposed sheet elements and a rupturable container of viscous processing fluid positioned adjacent a leading edge of the film unit. The viscous processing fluid being of the type which by its nature and composition has a viscosity that varies with temperature. The cassette is of the type which includes a film exit slot through which an exposed film unit may be advanced after exposure. Movable means are positioned adjacent the film exit slot for engaging the surface of at least one of the sheet elements of each film unit as each film unit is advanced through the exit slot subsequent to its exposure.

The processing apparatus itself comprises a housing which may form part of a camera or the like. The housing includes means for receiving and locating the cassette of self-processable film units in position for exposure.

A pair of elongated pressure applying members are provided in the form of rollers mounted in juxtaposed relationship to define a gap between them and positioned to receive the leading edge of each film unit as it is advanced, leading edge first, from the exposure position. The rollers serve to apply a first pressure to the advancing film unit to first rupture the container to release the processing fluid and then to cause the released mass of processing fluid to flow between the sheet elements opposite the direction of travel of the film unit through the roller gap so that the fluid is progressively deposited between the sheet elements as a thin layer extending over a predetermined photoexposed area of the film unit.

Additionally included are means for exerting a force against the movable means of the cassette. The force exerting means are responsive to ambient temperature to adjust the magnitude of the force applied thereby to compensate for variations in the thickness of the processing fluid layer caused by temperature induced changes in the viscosity of the processing fluid. The force exerting means in this manner operates to maintain the thickness of the processing fluid layer substantially constant over a predetermined temperature operating range of the apparatus thereby assuring optimum photographic image quality.

In the preferred embodiment, the force exerting means is provided in the form of an elongated bow shaped bimetallic strip which expands and contracts with temperature to vary the magnitude of the exerting force. The bimetallic strip is arranged with respect to the housing and the cassette such that the force exerted thereby is transmitted to the film unit via the cassette's movable means to create a second pressure in the film unit which opposes the flow of the processing fluid relative to the sheet elements as the sheet elements are advanced through the roller gap. The flow opposition pressure thus provided varies in accordance with the viscosity of the processing fluid.

The bimetallic strip also includes a pair of opposed supporting end portions and the apparatus further includes means for fixedly mounting the end portions to restrain movement in a direction opposite to the direction in which the force is exerted by the bimetallic strip while permitting at least one of the end portions to freely slide with respect to the other end portion in a direction transverse to the direction in which the force is exerted by the bimetallic strip.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

DESCRIPTION OF THE PREFERRED EMBODIMENT

In its preferred embodiment, the present invention is depicted as an integral part of an automatic camera for use in exposing and processing self-processable type film units.

Figure 1:
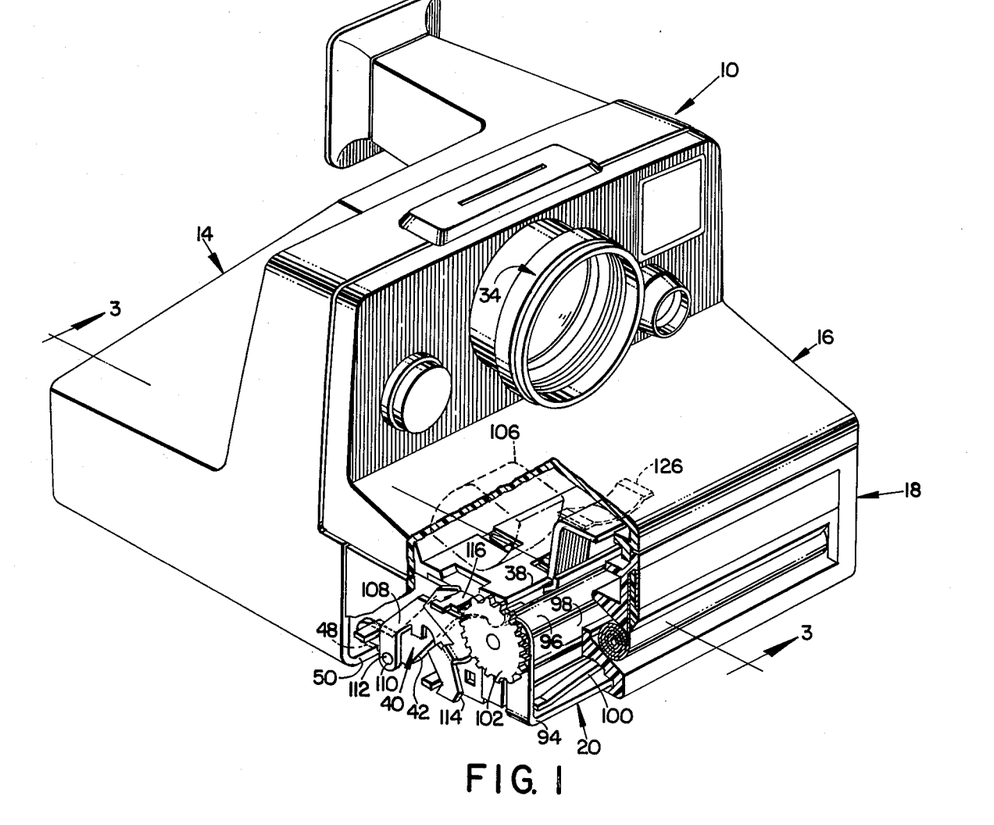
FIG. 1 is a perspective view, with parts broken away, of a self-processable type camera embodying the present invention.

Referring now to FIG. 1 there is shown a camera 10 in which the present invention may be incorporated. The camera 10 is generally adapted for use with a film cassette such as that designated at 12 in FIG. 2. FIG. 3 generally illustrates the cassette 12 as it is disposed within the camera 10.

The camera 10, as best shown with reference to FIGS. 1 and 3, comprises a body 14, a front cover 16, and a door 18 having a spread roller assembly, generally designated at 20, mounted thereon. The body 14, front cover 16 and door 18 interconnect to define the outward appearance of the camera 10 and serve as a protective enclosure for housing the camera's interior components.

Mounted within the protective enclosure thus formed is a hollow generally pyramid shaped member 22 located substantially within the body 14.

The member 22 is an injection molded opaque plastic piece of unitary construction comprising a forward wall 24, a rear wall 26, and a pair of side walls 28 (only one of which is shown) which interconnect to provide the camera 10 with an exposure chamber generally designated as 30. The forward wall 24 has an inlet aperture 32 mounted in optical alignment with a photographic objective lens 34 for admitting image bearing radiation emanating from the lens 34 into the exposure chamber 30 during exposure.

The bottom edges of the forward wall 24, the rear wall 26, and the side walls 28 cooperate to provide the exposure chamber 30 with an outlet aperture 36 through which radiation passes as it proceeds toward the cassette 12. Additionally, the bottom edges of the walls 24, 26 and 28 define a cassette mounting plane with which a portion of the cassette 12 may be brought into contact for purposes of locating it with respect to the outlet aperture 36.

Figure 3:
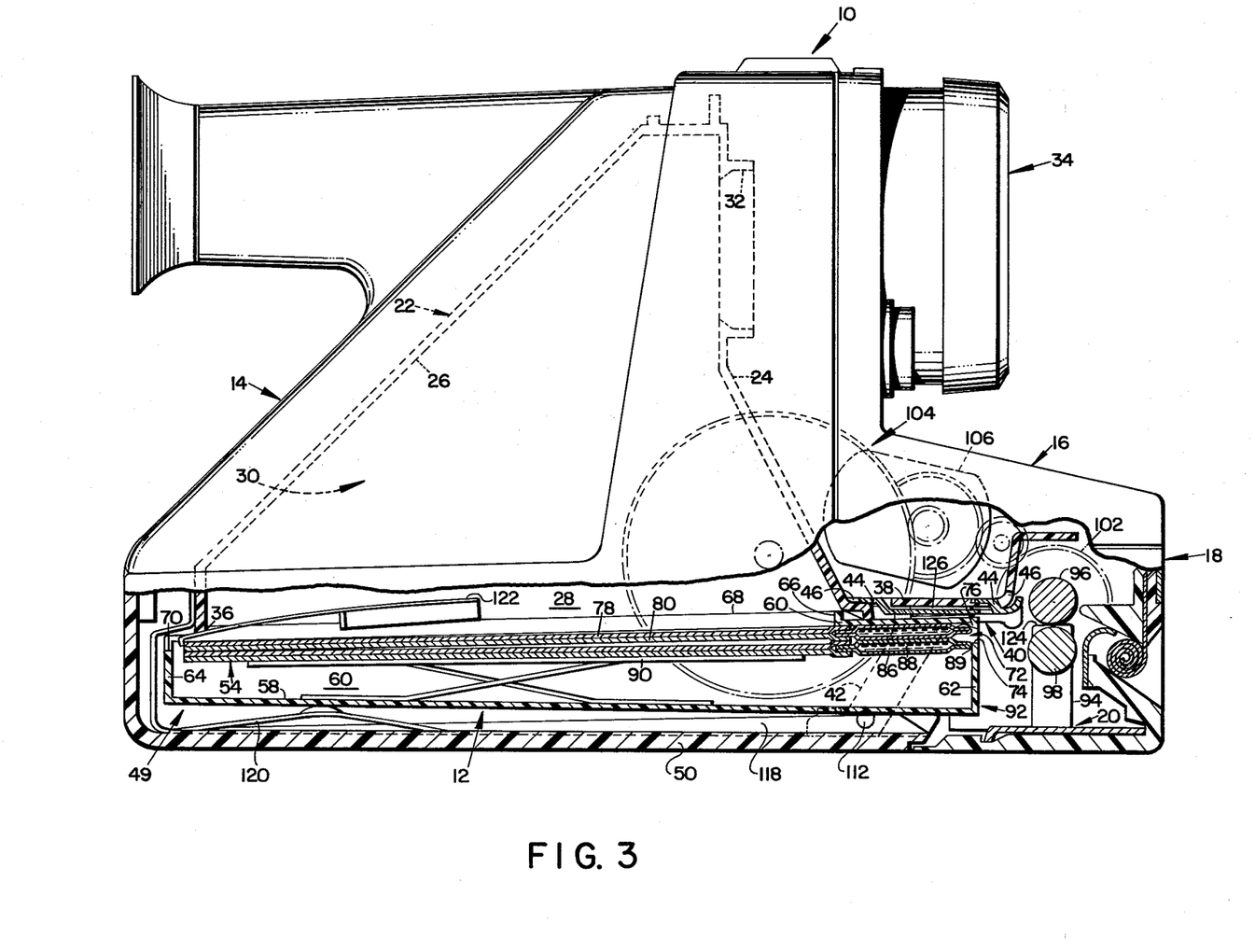
FIG. 3 is a partially sectioned side elevational view of the camera of FIG. 1 with the cassette of FIG. 2 positioned therein, the partial section being taken generally along line 3—3 of FIG. 1.
Figure 4:
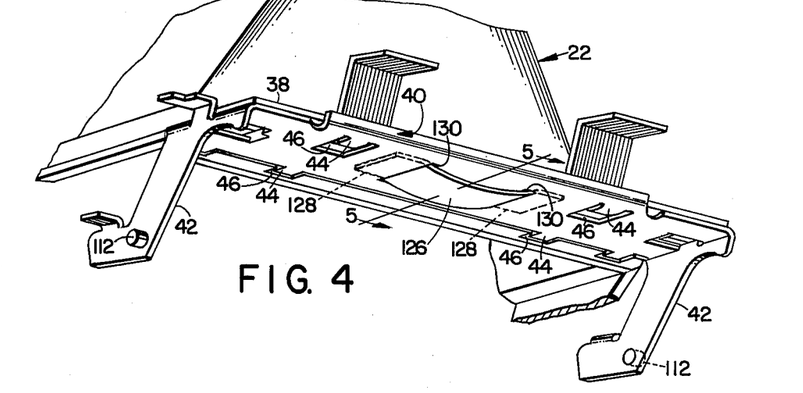
FIG. 4 is a perspective view of a portion of the camera of FIG. 1 embodying the invention.

Extending forwardly from the forward wall 24, in a generally horizontal plane, is a shelf 38 to which is attached a bracket 40 having a pair of downwardly extending legs 42 as best shown in FIG. 4. The bracket 40 may be attached to the shelf 38 in any well known manner but preferably includes means such as a tandem pair of spaced apart tabs 44 adapted to be snapped into correspondingly spaced apart complementary configured holes 46 in the shelf 38 (see FIG. 3) for effecting a snap fit connection to ease assembly.

The downwardly extending pair of legs 42 are mounted in a correspondingly spaced apart pair of slots 48 (see FIG. 6) located in a bottom wall 50 of the body 14. The legs 42 in this manner serve in part to space the cassette mounting plane of the member 22 away from the bottom wall 50 of the body 14 so as to provide a chamber 49 within the camera 10 for receiving the cassette 12. The member 22 is additionally supported within the camera 10 in this respect in a well known manner, the specific details of which are disclosed in U.S. Pat. No. 3,979,762 issued to Donald H. Hendry et. al. on Sept. 7, 1976 and entitled "MODULAR PHOTOGRAPHIC SYSTEM".

Figure 2:
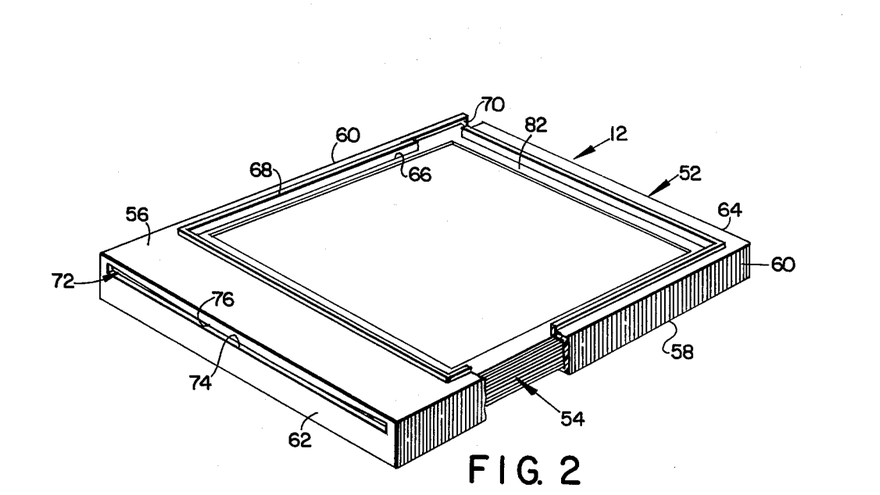
FIG. 2 is a perspective view, with parts broken away, of a cassette of self-processable type film units which may be used with the camera of FIG. 1.

Reference is now made to FIGS. 2 and 3 which show that the cassette 12 includes a generally rectangular shaped flexible plastic housing 52 which contains, in stacked relationship, a plurality of flat self-processable type film units designated generally as 54.

The housing 52 includes spaced apart top and bottom wall sections, 56 and 58 respectively, which are interconnected by a pair of opposed side wall sections 60 and a forward wall section 62 which opposes a rear wall section 64.

Figure 5:
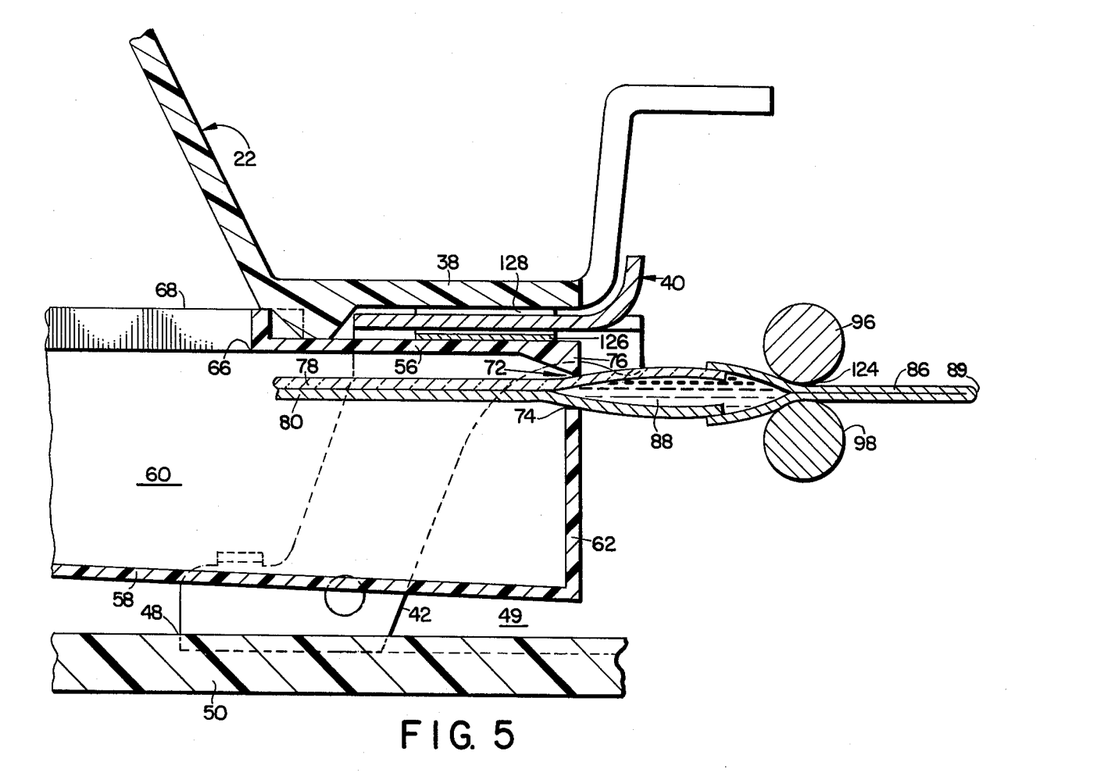
FIG. 5 is an enlarged cross-sectional side view of a portion of the camera of FIG. 1 including the cassette of FIG. 2 as generally taken along line 5—5 of FIG. 4.
Figure 6:
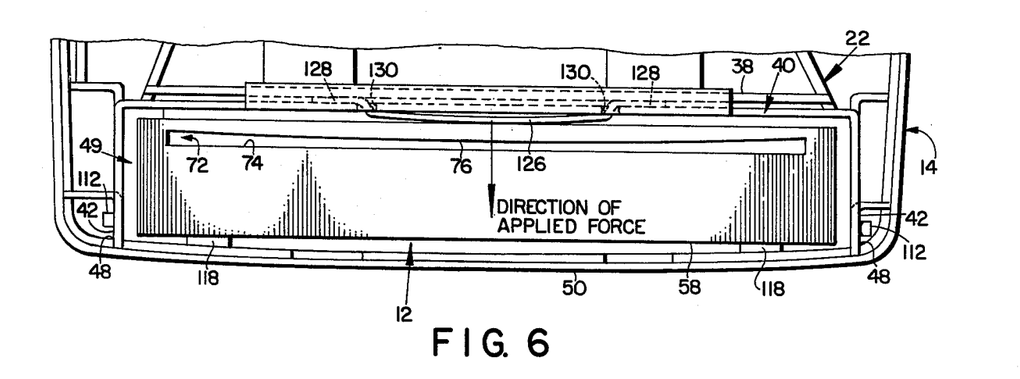
FIG. 6 is a front elevation of a portion of the camera of FIG. 1 with parts missing embodying the invention and the cassette of FIG. 2.

The top wall section 56 has an exposure aperture 66 therein which is surrounded by a vertically extending flange 68 and, additionally, includes an elongated slot 70 for facilitating a pick member 122 which advances film units from the housing 52 in a manner to be subsequently described. In this respect, the forward wall 62 includes an elongated exit slot 72 through which each film unit 54 may be advanced subsequent to its exposure. The exit slot 72 is formed by an edge 74 in the forward wall 62 and an elongated curved rib 76 which extends downwardly from the top wall 56 adjacent the forward wall 62 as best illustrated in FIGS. 5 and 6. The curved rib 76 is movable toward the edge 74 to provide a fluid flow control function.

Each film unit 54 is of the type that includes a pair of superposed sheet elements including a top transparent element 78 having photochemicals arranged in layers thereunder to define an image-receiving layer and a bottom sheet element 80 having other photochemicals arranged in layers thereon to define a photosensitive layer. The sheet elements, 78 and 80, are held together in face to face relation by a binding element 82 which overlaps their lateral edges and attaches to their outside non-facing surfaces. The edges of the binding element 82 define a masked area 84 on the surface of the transparent sheet element 78 through which the negative emulsion may be exposed (see FIGS. 7 or 8).

Each film unit 54 also includes a rupturable container 86 having a mass of viscous processing fluid 88 positioned adjacent a leading edge 89 of the film unit and adapted to have the processing fluid 88 released between the sheet elements 78 and 80 in order to initiate a diffusion transfer process to develop and form a visible image in the film unit 54 subsequent to its exposure.

The cassette 12 also includes a spring like platen member 90 (see FIG. 3) which is located between the bottom wall section 58 and the stacked array of film units 54 so as to continuously urge a forwardmost one of the film units 54 toward the top wall so that each film unit, in turn, may have its exposure area 84 in registration with the exposure aperture 66 of the top wall section 56.

Preferably included in the cassette 12, but not shown, is a battery located inside the housing 52 next to the bottom wall section 58 for powering the various components of the camera 10 and a dark slide to temporarily protect the film units 54 from ambient light while outside of the camera 10.

The manner in which a user loads the cassette 12 into the cassette receiving chamber 49 of camera 10 so that the film units 54 are located in position for exposure may best be understood with reference to FIGS. 1, 3, 4 and 6 which collectively show additional features of the camera 10 that relate to the loading operation as well as to the processing of film units 54.

Referring now to those figures, there is shown an arrangement by which the door 18 and the attached spread roller assembly 20 may be pivotally rotated out of the closed position (shown in FIGS. 1 and 3) to an open position (not shown) by which access may be had to an entrance located near the forward end of the cassette receiving chamber 49 and generally designated by 92.

The spread roller assembly 20 comprises a U-shaped bracket 94 having rotatably mounted thereon a pair of juxtaposed rollers, 96 and 98, which are resiliently urged toward one another by a generally bow-shaped spring 100. The top roller 96 has a drive gear 102 fastened to one of its ends for purposes of engaging a gear train generally shown in phantom in FIG. 3 at 104. The drive train 104 is powered by a motor 106 which is also shown in phantom in FIGS. 1 and 3.

The U-shaped bracket 94 includes a spaced apart pair of rearwardly extending arms 108 (only one shown) each of which has a bearing hole 110 adapted to be mounted on a pair of correspondingly configured journals 112 which extend sidewardly from the legs 42 of the bracket 40 (see FIG. 1). The door 18 and the spread roller assembly 20 connect with one another to form a camera subassembly which is adapted to be snapped onto the bracket 40 via the journals 112 so that the entire subassembly thus formed may pivot about the journals 112 to the open position to permit loading of the camera 10. The cassette 12 may then be inserted into the cassette receiving chamber 92 to assume its position shown in FIG. 3. Afterwards, the subassembly is pivoted to its closed position and is retained there via a latch 114 that connects with a tab 116 of the bracket 40 to lock the subassembly in the closed position where it blocks the entrance 92 thereby automatically positioning the rollers 96 and 98 in a predetermined position with respect to the cassette exit slot 72. Also when the spread roller assembly 20 is in the closed position, the drive gear 102 is automatically connected to the gear train 104. For a more detailed description of this arrangement, reference may be had to U.S. Pat. No. 3,974,510 issued to Andrew S. Ivester on Aug. 10, 1976 and entitled "MOUNTING APPARATUS FOR SPREADER ROLLER ASSEMBLY" and U.S. Pat. No. 4,000,500 issued to Andrew S. Ivester, et. al. on Dec. 28, 1976 and entitled "FILM CASSETTE LOADING DOOR LATCH AND INTERLOCK SWITCH FOR PHOTOGRAPHIC APPARATUS".

Means have also been provided in the camera 10 for assuring that the cassette 12 is properly located for exposure. These means take the form of a pair of spaced apart camming ramps 118 (only one shown in FIG. 3) and a pair of spring like battery contacts 120 (only one shown), both of which cooperate to urge the cassette 12 against the cassette mounting plane previously defined such that the flange 68 extending from the top wall section 56 of the cassette 12 is telescopically received within the outlet aperture 36 located at the base of the exposure chamber 30. The described features of the camera 10 and the cassette 12 thus disclose means for locating the film units 54 at a position for exposure.

Exposure occurs in a well known manner via a shutter (not shown) which allows image-bearing light from the lens 34 to enter the exposure chamber 230 via its inlet aperture 32. The radiation than strikes a mirror (not shown) located on the rear wall 26 of the member 22 which reflects it onto a forwardmost film unit 54 where it passes through the transparent top sheet element 78 to form an image pattern in the negative emulsion on the bottom sheet element 80.

The exposed film unit 54 is then advanced from the exposure position via the exit slot 72 of the cassette 12 by the pick member 122 which enters the elongated slot 70 of the cassette 12 to engage the trailing edge of a forwardmost film unit 54. The pick member 122 is powered by the motor 106 via the gear train 104 in a well known manner to provide a force to push the exposed film unit 54 out of the cassette 12, such that its leading edge 89 is brought into engagement with a gap 124 formed between the rollers 96 and 98. At some appropriate time prior to this occurring, the top roller 96 is caused to rotate so that when the leading edge of the film unit 89 enters the gap 124, it is further advanced through the gap by the rotating roller 96. This arrangement for advancing the exposed film unit is explained in further detail in, for example, U.S. Pat. No. 3,967,304 issued to Bruce K. Johnson, et. al. on June 29, 1976 and entitled "MODULAR CONSTRUCTED SEQUENCING SYSTEM FOR PHOTOGRAPHIC APPARATUS".

Once the exposed film unit 54 enters the roller gap 124, the rollers, 96 and 98, exert a pressure on the film unit 54 to first rupture the container 86 to release the viscous processing fluid 88 (see FIG. 5) between the sheet elements, 78 and 80, and then to cause the released mass of the processing fluid 88 to flow between the sheet elements, 78 and 80, in a direction opposite to the direction of advancement of the film unit 54 so that the processing fluid 88 is gradually deposited between the sheet elements, 78 and 80, in a thin layer coextensive with the exposure area 84.

For optimum photographic image quality, it is desirable that the thickness of the processing fluid layer be maintained substantially constant over the exposure area 84. However, because the nature and composition of the viscous processing fluid 88 is such that its viscosity varies with ambient temperature and the fact that the viscosity of the processing fluid 88 influences the thickness and uniformity of the processing fluid layer, it is not always possible to achieve optimum results because the camera 10 is used over a range of operating temperatures which are sufficient to change the viscosity of the processing fluid 88 and thereby introduce undesirable changes in the thickness and uniformity of the processing fluid layer.

This problem is alleviated by the provision of means for creating a second pressure in the film unit to oppose the flow of the processing fluid 88 relative to the sheet elements 78 and 80, as the film unit is advanced through the roller gap 124, in order to compensate for variations in the thickness and uniformity of the processing fluid layer which are caused by temperature induced variations in the viscosity of the processing fluid 88 such that the thickness of the processing fluid layer is maintained substantially constant over a predetermined range of operating temperatures for the camera 10. Typically, the temperature operating range would be from 40° F to 100° F.

The means for creating this flow opposition pressure comprise an elongated bow-shaped bimetallic strip 126 of predetermined width. Referring now to FIGS. 1, 4 and 6, there is shown the bimetallic strip 126 which includes a pair of opposed supporting end portions 128 which respectively pass through a pair of spaced apart slots 130 in the bracket 40. The supporting end portions 128 are trapped between the bracket 40 and the horizontal shelf 38 of the member 22. The bow-shaped portion of the bimetallic strip 126 extends downwardly from the bracket 40 to contact the top wall section 56 of the cassette 12 near its exit slot 72. As the ambient temperature changes, the bimetallic strip expands or contracts to force the movable rib 76 of the cassette 12 toward or away from a film unit 54 as the film unit 54 advances through the exit slot 72. In this manner, the force created by the bimetallic strip 126 is transmitted to a film unit 54 via the rib 76 of the cassette 12. The force-temperature characteristics of the bimetallic strip 126 are chosen so that the force exerted by the bimetallic strip 126 varies in accordance with temperature induced viscosity changes of the processing fluid 88. However, the force exerted on the cassette 12 by the bimetallic strip via the rib 76 should be chosen so that it is never sufficient to prematurely rupture the container 86.

The mounting arrangement for the bimetallic strip 126 is such that its end portions 128 are fixedly mounted with respect to the horizontal shelf 38 so that the shelf 38 supports reaction loads in a direction opposite to the direction in which the bimetallic strip 126 applies the force against the cassette 12 while permitting at least one of the supporting end portions 128 to freely slide with respect to the other end portion in a direction transverse to the direction of applied force (see FIG. 6).

Figure 7:
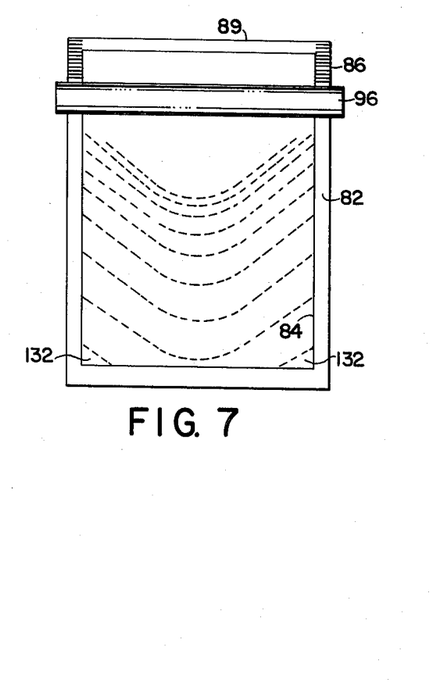
FIG. 7 is a diagrammatic plan view showing in dotted lines the progressive advancement of a fluid wave front across the photoexposed area of a film unit when the invention is not used.
Figure 8:
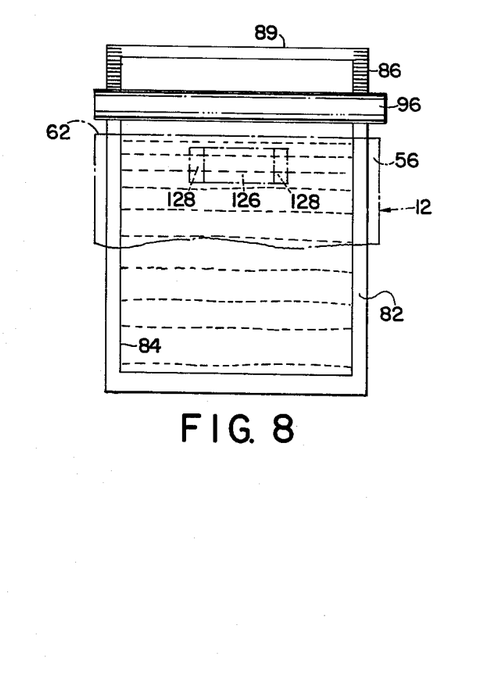
FIG. 8 is a diagrammatic plan view showing in dotted lines the progressive advancement of a fluid wave front across the photoexposed area of a film unit when the invention is used.

The affect of the bimetallic strip 126 in cooperation with the curved rib 76 may be best understood with reference to FIGS. 5, 7 and 8. FIG. 5 shows that the rib 76 contacts the top sheet element 78 near the advancing wave front of the processing fluid 88 as the film unit 54 advances through the exit slot 72 and urges it toward the bottom sheet element 80 to create a pressure in opposition to the flow of the fluid relative to the sheet elements, 78 and 80. In the absence of the rib 76, the flow pattern that would result is illustrated in FIG. 7 which shows that the wave front of the processing fluid 88 would advance across the exposure area 84 in a tongue shaped pattern. This is undesirable because it influences uniformity and can result in incomplete coverage of the exposure area 84 near the corners of the trailing end of the film unit as designated at 132. The rib 76 operates to change the advancing wave front pattern of the processing fluid 88 to a substantially rectangular shape as shown in FIG. 8. The rectangular shape improves both uniformity and coverage performance through a redistribution of the processing fluid 88 so that it is more or less spread evenly over the exposure area 84. However, even with this improvement it is still possible for the thickness of the layer to change because of temperature induced viscosity changes in the processing fluid 88. This problem is corrected with the bimetallic strip 126 because it compensates for thickness changes by responding to the ambient temperature to provide the correct amount of flow opposition pressure which operates to maintain a substantially uniform thickness in the processing fluid layer regardless of variation in the temperature. In this manner, the thickness of the fluid layer is maintained substantially constant over the exposed area 84 throughout the temperature operating range of the camera 10.

One bimetallic material found suitable for this purpose was a 0.012 inch thick strip of TRUFLEX®, P675R, manufactured by Texas Instruments, Inc., Thermostat and Special Metals Div., Attleboro, Mass. With this material, deflections at the midpoint of the bow of the bimetallic strip 126 varies over a range of ±0.015 with respect to a nominal deflection measured at 75° F, the extreme deflections being measured at 40° F and 100° F. With these deflections and corresponding forces, the fluid layer thickness was maintained substantially at a nominal value of 0.003 inches over the temperature range indicated, while without the bimetallic strip 126, the thickness varied ±0.0002 around the nominal. This latter variation exceeded the desirable tolerance of 0.00015 inches.

Certain changes may be made in the above described embodiment without departing from the scope of the invention and those skilled in the art may make such changes according to the teachings of the disclosure. Therefore, it is intended that all matter contained in the above description or shown in the accompanying drawings shall be interpreted as illustrative and not in a limiting sense.

What is claimed is:

1. Photographic processing apparatus for use with a self-processable film unit of the type including a pair of sheet elements and a rupturable container of processing fluid positioned adjacent a leading edge of the film unit, the processing fluid having a viscosity which varies with temperature, said apparatus comprising:

means for spreading the processing fluid in a thin layer between the sheet elements, said fluid spreading means including a pair of elongated juxtaposed pressure applying members which define an elongated gap through which the film unit is advanced with the sheet elements in superposed relationship to apply a first pressure to the film unit to first rupture the container to release the processing fluid and then to cause the released mass of processing fluid to flow between the sheet elements opposite to the direction of advancement of the film unit through said gap such that the processing fluid is progressively deposited between the sheet elements as a thin layer extending over a preselected area of the sheet elements;

means for advancing the film unit through said gap; and means for applying a second pressure to the film unit to oppose the flow of the processing fluid relative to the sheet elements as the film unit is advanced through said gap, said means for applying a second pressure being responsive to ambient temperature to adjust the magnitude of the flow opposition pressure applied so that the thickness of the processing fluid layer is maintained substantially constant over a predetermined temperature operating range of said apparatus.

2. The apparatus of claim 1 wherein said means for applying said second pressure comprises:

(a) means for contacting at least one of the sheet elements on its outside surface as the film unit is advanced therepast; and (b) means, associated with said sheet contacting means, for sensing ambient temperature and in response thereto exerting a force against said sheet contacting means which force varies in correspondence with ambient temperature to cause said sheet contacting means to urge the sheet elements toward one another to create said second flow opposition pressure, said sheet contacting means and said temperature sensing means being configured and arranged with respect to one another so that said second flow opposition pressure varies in correspondence with the processing fluid's viscosity.

3. The apparatus of claim 2 wherein said temperature sensing means is a bimetallic strip which expands and contracts as a function of temperature to vary the magnitude of the force exerted thereby against said sheet contacting means.

4. The apparatus of claim 3 wherein said bimetallic strip is an elongated bow shaped member of predetermined width and having opposed supporting end portions and wherein said apparatus further includes means for fixedly mounting said end portions in a direction opposite to the direction in which said exerting force is applied while permitting at least one of said end portions to freely slide with respect to the other said end portion in a direction transverse the direction in which said exerting force is applied.

5. Photographic processing apparatus for use with a self-processable film unit of the type including a pair of superposed sheet elements and a rupturable container of processing fluid positioned adjacent a leading edge of the film unit, the processing fluid having a viscosity which varies with temperature, said apparatus comprising:

means for supporting the film unit in position for exposure;

first and second elongated pressure applying members mounted in juxtaposed relationship to define a gap positioned to receive the leading edge of the film unit as the film unit is advanced, leading edge first, from said exposure position, said pressure applying members serving to apply a first pressure to the film unit as the film unit is advanced through said gap to first rupture the container of processing fluid to release the processing fluid and then to cause the mass of released processing fluid to flow between the sheet elements opposite to the direction of advancement of the film unit through said gap such that the processing fluid is progressively deposited between the sheet elements as a thin layer extending over a preselected photoexposed area of the sheet elements;

means for advancing the film unit from said exposure position and through said gap; and means cooperative with said supporting means to create a second pressure applied to the film unit to oppose the flow of the processing fluid relative to the sheet elements as the film unit is advanced through said gap, said means for applying a second pressure being responsive to ambient temperature to adjust the magnitude of said second flow opposition pressure so that the thickness of the processing fluid layer over the photoexposed area of the sheet elements is maintained substantially constant over a predetermined temperature operating range of said apparatus.

6. The apparatus of claim 5 wherein said film unit supporting means includes means for contacting at least one of the film unit's sheet elements on its outside surface as the film unit is advanced from said exposure position toward said gap and wherein said means for applying a second pressure is configured and arranged with respect to said sheet contacting means and said film unit supporting means to exert a force against said sheet contacting means, in accordance with the ambient temperature, to cause said sheet contacting means to urge the sheet elements toward one another to create said second fluid flow opposition pressure, said sheet contacting means and said means for applying a second pressure being further configured and arranged with respect to one another so that said second fluid flow opposition pressure varies in correspondence with the viscosity of the processing fluid.

7. The apparatus of claim 6 wherein said temperature responsive means is a bimetallic strip which expands and contracts as a function of temperature to vary the magnitude of the force exerted against said sheet contacting means.

8. The apparatus of claim 7 wherein said bimetallic strip is an elongated bow shaped member of predetermined width and having opposed supporting end portions and wherein said apparatus further includes means for fixedly mounting said end portions in a direction opposite to the direction in which said exerting force is applied while permitting at least one of said end portions to freely slide with respect to the other said end portion in a direction transverse the direction in which said exerting force is applied.

9. Photographic processing apparatus for use with a cassette of self-processable film units of the type wherein each film unit includes a pair of superposed sheet elements and a rupturable container of processing fluid positioned adjacent a leading edge of each film unit, the processing fluid has a viscosity that varies with temperature, and the cassette includes a film exit slot and movable means positioned adjacent the film exit slot for engaging the surface of at least one of the sheet elements of each film unit as each film unit is advanced through the exit slot subsequent to its exposure, said apparatus comprising:

a housing including means for receiving and locating the cassette of self-processable film units in position for exposure;

first and second elongated pressure applying members mounted in juxtaposed relationship to define an elongated gap positioned to receive the leading edge of each film unit as it is advanced, leading edge first, from said exposure position through the exit slot, said pressure applying members serving to apply a first pressure to the advancing film unit to effect first the rupture of the container to release the processing fluid and then to cause the released mass of processing fluid to flow between the sheet elements opposite the direction of advancement of the film unit through said gap so that the fluid is progressively deposited between the sheet elements as a thin layer extending over a predetermined photoexposed area of the film unit;

means for advancing each film unit from the cassette via the cassette's exit slot and through said gap; and means for exerting a force against the movable means of the cassette, said force exerting means being responsive to ambient temperature to adjust the magnitude of said force to compensate for variations in the thickness of the processing fluid layer caused by temperature induced changes in the viscosity of the processing fluid so that the thickness of the processing fluid layer is maintained substantially constant over a predetermined temperature operating range of said apparatus.

10. The apparatus of claim 9 wherein said force exerting means is further configured and arranged with respect to said housing and the cassette as disposed in said exposure position so that said force exerted thereby and transmitted to an advancing film unit via the cassette's movable means is always insufficient to rupture the container of viscous processing fluid thereby preventing the fluid contents of the container from being prematurely released before the fluid container is brought into engagement with said gap.

11. The apparatus of claim 9 wherein said temperature responsive means is a bimetallic strip which expands and contracts as a function of temperature to vary the magnitude of the force exerted against the cassette.

12. The apparatus of claim 11 wherein said bimetallic strip is an elongated bow shaped member of predetermined width and having opposed supporting end portins and wherein said apparatus further includes means for fixedly mounting said end portions in a direction opposite to the direction in which said exerting force is applied while permitting at least one of said end portions to freely slide with respect to the other said end portion in a direction transverse the direction in which said exerting force is applied.

* * * * *